March 11, 1952 W. W. CARGILL, JR 2,588,380

METHOD AND APPARATUS FOR TRANSMITTING INTELLIGENCE BY RADIO WAVES

Filed Aug. 3, 1945 3 Sheets-Sheet 1

INVENTOR

WILLIAM W. CARGILL JR.

BY

Ralph L. Chappell

ATTORNEY

March 11, 1952 W. W. CARGILL, JR 2,588,380

METHOD AND APPARATUS FOR TRANSMITTING INTELLIGENCE BY RADIO WAVES

Filed Aug. 3, 1945 3 Sheets-Sheet 2

INVENTOR
WILLIAM W. CARGILL JR.
BY
Ralph L. Chappell
ATTORNEY

March 11, 1952 W. W. CARGILL, JR 2,588,380

METHOD AND APPARATUS FOR TRANSMITTING INTELLIGENCE BY RADIO WAVES

Filed Aug. 3, 1945 3 Sheets-Sheet 3

INVENTOR
WILLIAM W. CARGILL. JR.
BY
Ralph L. Chappell
ATTORNEY

Patented Mar. 11, 1952 2,588,380

UNITED STATES PATENT OFFICE 2,588,380

METHOD AND APPARATUS FOR TRANSMITTING INTELLIGENCE BY RADIO WAVES

William W. Cargill, Jr., Madison, Wis.

Application August 3, 1945, Serial No. 608,801

5 Claims. (Cl. 179—100.1)

(Granted under the act of March 3, 1883, as amended April 30, 1928; 370 O. G. 757)

This invention relates to a method and apparatus for transmitting intelligence by radio waves.

The principal object of this invention is to save time in radio transmission and to provide for the transmission of any message in as little as one ten-thousandth of the time normally required to speak the same message.

At present, as far as is known, it requires the same time to transmit a radio message as it does to speak the same message.

Other objects of the invention are to enable such apparatus to send a greater volume of traffic than other known existing units, and to provide an element of military security, inasmuch as it is extremely unlikely that any such message sent in accordance with the present invention could be detected by the enemy. In case of detection, it is unlikely that the enemy could detect the location of the sending station since time is not available to make a radio fix with such a short transmitting time; and if the sending station were located, it is highly improbable that the enemy could unscramble or decipher any message sent in the manner contemplated herein.

This invention combines a plurality of fundamental methods to achieve its results.

One such method records a message to be sent and then, in sending that message, speeds up the recording machine in such a manner that the sounds subsequently detected are unintelligible.

The second principle involves taking a message of a given time length, as it is naturally spoken, and separating that message into an arbitrary number of equal parts. After this has been done, each part is sent simultaneously with the others, thereby reducing the time for sending the whole message to that of sending one part.

It can be seen that if a recording of a message has its speed doubled when played into a radio transmitter, it requires but half the time to transmit it by radio as it did to make the recording.

In a like manner, if a recording is played at normal speed, but has two pickup devices each taking half the message simultaneously, then the time required for radio transmission, with a separate transmitter for each pick-up, is one-half the time required to make the recording.

If then, as in this case, both methods are used, the transmitting time is one-quarter of the original recording time. This time reduction corresponds directly to the speed ratio and the number of pickups.

In accomplishing these and other objects of the present invention, I have provided improved details in the structure of the apparatus and improved steps in the method, the preferred form of which is illustrated in the accompanying drawings wherein.

Figure 1:
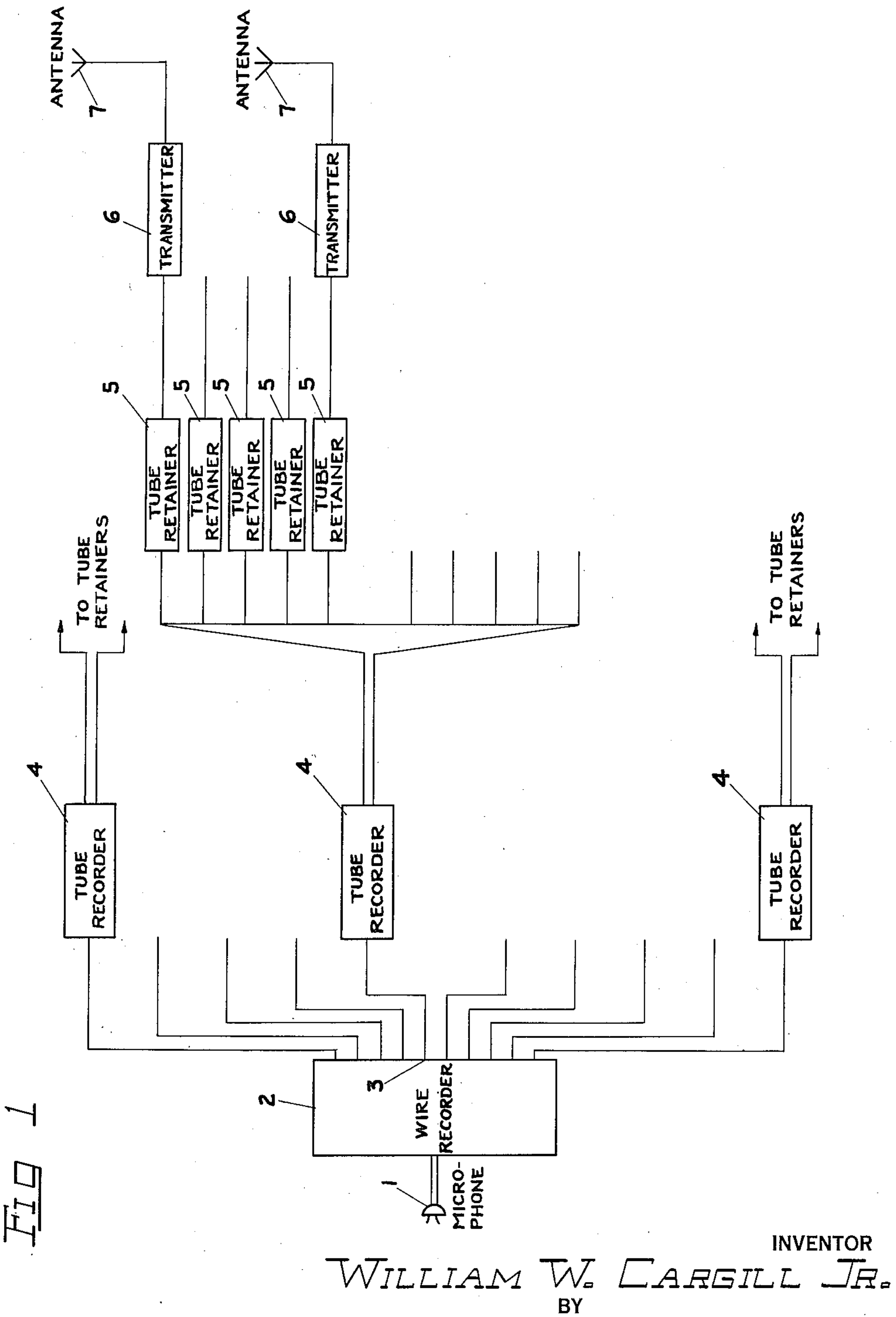
Fig. 1 is a diagrammatic illustration of the apparatus embodying my invention.

Referring more in detail to the drawings:

In Fig. 1, there is shown a microphone 1, the output of which is applied to a wire recorder 2. The wire in recorder 2 is so stored that there are accessible along its length ten points to which pickup units 3 may be applied to the wire. These points are spaced an equal distance along the length of the wire, so that when the recorder 2 is played back, the first pickup in line will receive the first tenth of the recorded message, and simultaneously the second pickup will receive the second tenth, and so on. Thus, when the recorder 2 is played back, it is necessary to run it through only one-tenth of the distance it ran when the message was applied by the microphone.

In practice it is preferred to play back the recorder 2 faster, for example, ten times faster, than the speed at which it was operated during recording of the message. Thus the total time required for playing back the wire recorder 2 to apply the message to the ten pickups 3 is only one one-hundredth of the time required for the microphone 1 to apply the message to the recorder. This is because the recorder is played back through only one-tenth of the original distance, and it is run ten times faster.

Each pickup 3 applies its message to its respective tube recorder 4, which acts in the same manner as the wire recorder 2 in receiving, holding and relaying the message. The tube recorders 4 are capable of accepting the highly accelerated signal produced by the wire recorder 2. Upon completion of this acceptance, each tube recorder 4 then delivers the signal which it received to ten subordinate tube retainers 5. This makes a total of one hundred tube retainers 5, or ten for each tube recorder 4. At the same time, the tube recorders 4 speed up the transmission of the signal at the ratio of ten to one, for example, over that at which it was received. When all tube retainers 5 have received their signal, they all simultaneously feed their signals into separate transmitters 6, one or more transmitters for all tube retainers, are desired. These signals are then sent out on the air by means of a conventional antenna 7.

In other words (1) message$\times$10 (accelerations) $\times$10 (recorder units) $\times$10 (accelerations) $\times$10 (retainer units) equals 10,000 i. e. the original message may be sent at one ten-thousandth of the time it took to speak it.

Figure 2:
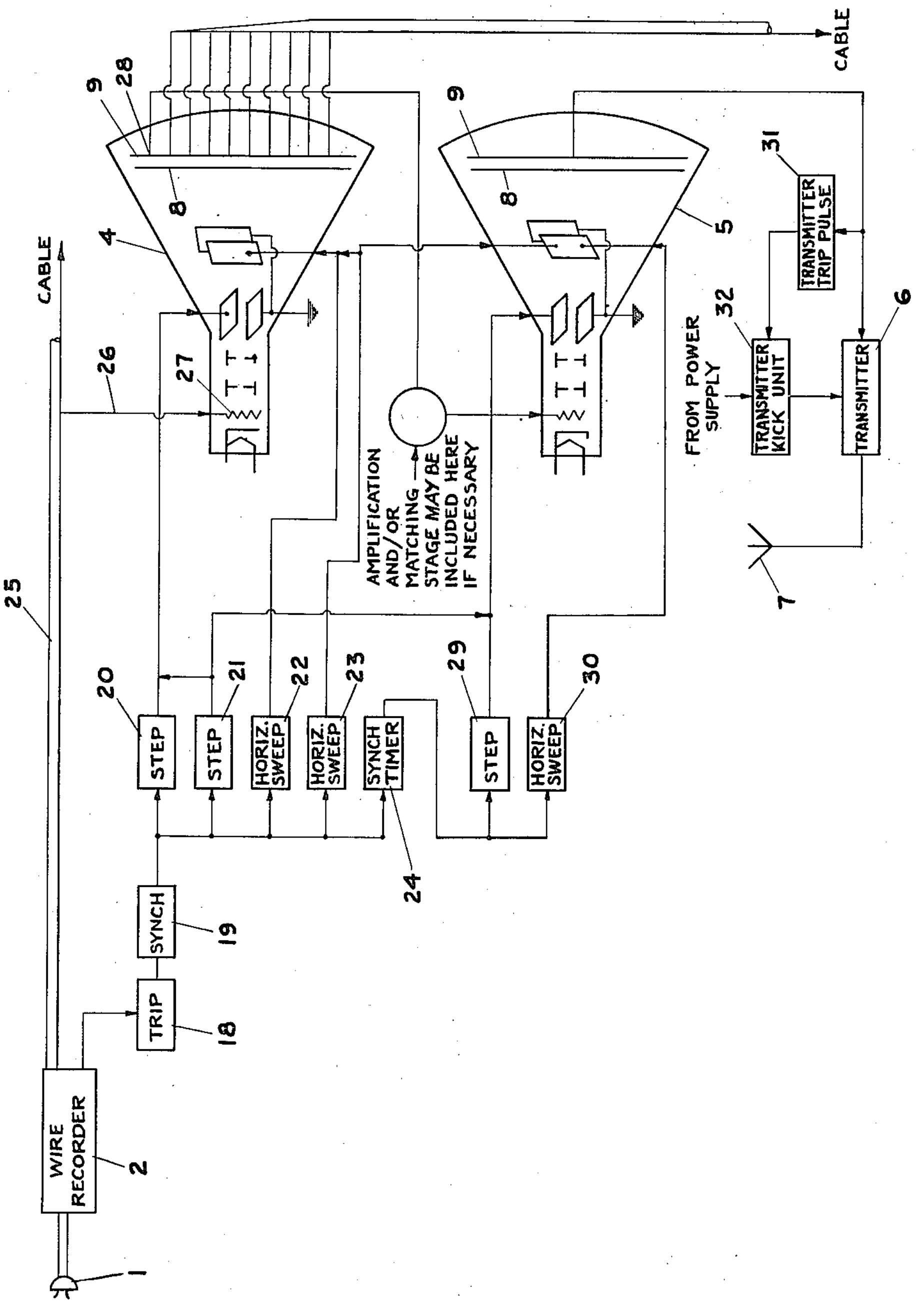
Fig. 2 is a more detailed diagrammatic view of an illustrative tube recorder and tube retainer.

Reference is now made to Fig. 2. It will be noted that all the tube recorders are represented by unit 4. Similarly, all tube retainers are represented by unit 5 alone. This is believed to be sufficiently clear to understand the invention, since the circuits supplying the tube recorders are similar and, in like manner, the circuits supplying the tube retainers are also similar.

The tube recorders 4 and the tube retainers 5 are similar to conventional cathode ray tubes, except in the present omission of the conventional fluorescent screen for receiving the cathode ray. I have substituted plates 8 and 9 for the screens to be used for the reception of the cathode ray beam.

Figure 3:
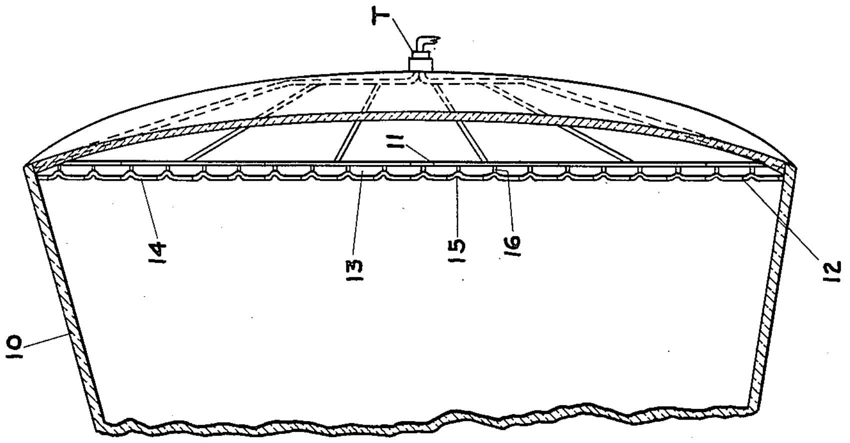
Fig. 3 is a detail fragmentary vertical cross-sectional view of the forward end of a cathode ray tube embodying this invention.

In Fig. 3, 10 generally designates the forward part of the cathode ray tube. This tube preferably includes a conventional glass envelope, without the usual fluorescent screen, but in its place, the condenser plates 11 and 12 are provided. Each condenser plate consists of first, a plurality of common plates 11, in this instance ten, nearest what would normally be the fluorescent screen. The condenser plates have leads to a multi-post terminal T, as indicated. Next a gas dielectric of low pressure is provided in the space 13 and finally the assembly 12 of individual plates 14 are provided nearest the cathode, not shown, of the tube.

Figure 4:
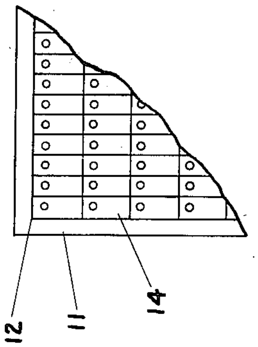
Fig. 4 is a detail fragmentary elevational view showing the individual plates.

In Fig. 4, the individual plates 14 facing the cathode of the tube 10 are shown. These plates are preferably arranged in groups in rows parallel to each other.

Figure 5:
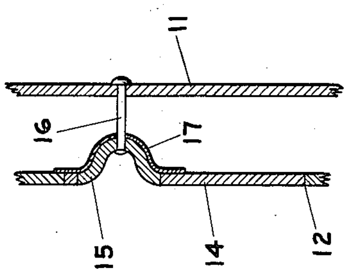
Fig. 5 is an enlarged detail vertical cross-sectional view of an individual plate and its relation to a common plate.

An individual plate 14 of these groups is shown in Fig. 5. It contains first, the individual plate. Centrally arranged in the upper part of the plate is an insulator 15 in the center of which is provided a connection 16 to a common plate 11. Immediately between the plates 14 and the common plate 11 lies the gas or dielectric.

Particular attention should be given to the round insulator 15 in the upper part of the individual plates 14. It should be noted that this insulator is preferably cup shaped with its apex pointing toward its common plate 11. At the center of the apex of the insulator, protruding through it, is the metallic connection 16 to the common plate. On the side of the insulator, which is toward the common plate 11, in the dielectric, is deposited a very thin film 17, for example one or two molecules, of conductive material, however, of a relatively resistant nature.

The operation of these plates 14 is as follows: The cathode ray developed in the tube 10 deposits on the lower portions of the plates 14 a certain number of electrons. These electrons act in a manner similar to those gathered upon any plate in any ordinary condenser. They repel a corresponding number of electrons from the common plate 11 to the rear thereof. Inasmuch as there is a recess in the individual plates 12 which is represented by the interior of the cupped insulator 15, this recess will then have an electrostatic charge in proportion to the number of electrons on the plate 14. Therefore, as a constant beam of electrons is aimed at the center of this recess, a certain number of them are repelled, dependent upon the strength of the electrostatic charge, which in turn depends upon the number of electrons previously deposited upon the plate. This means then, that the number of electrons which get through to the connection 16 of the common plate at the center of the insulator 15, are also in proportion to the number of electrons originally deposited upon the lower part of the plate. Bearing this in mind, it can then be seen that as a cathode ray beam sweeps the individual plates in a scanning manner, and also if the beam varies in intensity, and scans below the insulator recesses of each plate, then each separate plate receives the corresponding amount of charge relative to the intensity of the beam at the instant it crosses the plate. Therefore, each plate bears a varying charge, plus or minus, relative to that of its neighbor plates. Then, after this is done, a beam of constant intensity sweeps the plates at their insulator recesses, and the electrons are received by the connection 16 to the common plate in proportion to the amount of charge on each individual plate. In this way, the change of potential on the common plate varies inversely as the charges upon the individual plates when the beam of constant intensity swept across the openings in the plates 14. The electrostatic charge for each plate 14 is dependent upon the number of electrons it gathered from the initial beam which was varying in intensity.

The tubes 10 described above are employed in the circuit of this invention in the manner illustrated in Fig. 2 herein. The numeral 4 designates the use of such a tube as the tube recorder of Figs. 1 and 2.

Referring to Fig. 2, initiation of play back of wire recorder 2 actuates a tripping circuit 18 which in turn actuates a synchronizer circuit 19. The synchronizer circuit 19 may consist of any suitable circuit for generating a square wave of predetermined frequency. Initial triggering of synchronizer 19 actuates a step generating circuit 20 which applies a rising voltage of ten steps to the vertical deflection plates of the tube recorder 4. Simultaneously, a horizontal sweep circuit 22 is actuated to cause the beam in recorder 4 to sweep horizontally across the plate 8. The beam is thus swept back and forth across the tube recorder screen by virtue of the cooperative operation of the sweep generator 22 and the vertical step generator 20. This operation is well known in the art of television, and reference is made to that art for the required circuital details.

While the cathode beam is sweeping the plate 8, its intensity is being modulated by the grid 27, in accordance with the signals received by the appropriate pickup 3 and fed to the grid through wires 25 and 26. Upon completion of the sweeping operation, which coincides with the time required for pickup 3 to receive its assigned tenth of the message from the recorder 2, each of the ten tube recorders 4 will have retained on its screen 8 a given tenth of the original message.

The message stored in the recorders 4 is now ready to be taken from the recorders and applied to the tube retainers 5, of which there are 10 to each recorder 4.

In Fig. 2, it will be seen that tube recorder 4 has ten vertical rows of condenser plates, each row being connected to an individual tube retainer 5, only one of which is shown in Fig. 2, connected to the first of the rows as shown at 28. The tube retainers 5 are similar to the tube recorders 4, except instead of having a plurality of rows of condenser plates, they have only one row.

Upon completion of storing of the message in the tube recorders 4, the synchronizer 19 flips back and triggers another step generating circuit 21 and another horizontal sweep circuit 23. The cooperative operation of these circuits is similar to that of the circuits 20 and 22, respectively, except that circuits 21 and 23 operate through a cycle at an accelerated rate, for example, ten times as fast as the circuits 20 and 22.

Actuation of the circuits 21 and 23 causes the beam in the tube recorder 4 to again sweep the plate 8, this time with a constant intensity, for the purpose of taking off the message stored on the plate 9. The first tenth of the message is applied to the first of the ten tube retainers 5, through the connection 28 by modulation of the grid of retainer 5. The beam of the tube retainer 5 is caused to sweep across its plate 8 simultaneously with the sweep of the take-off beam in the tube recorder 4. Each of the ten tube retainers is placed in operation successively. Thus, as the take-off beam sweeps the top row of condenser plates 14 in the tube recorder 4, the first of the tube retainers 5 will sweep its beam synchronously, thereby storing the first tenth of the message retained on the tube recorder 4. As the second row of condenser plates 14 in the tube recorder 4 is being swept, the second tube retainer 5 will sweep its beam synchronously and store the second tenth of the message. The operation continues until the message has been entirely transferred from each tube recorder 4 to its ten tube retainers 5.

At this point the message has been divided into 100 parts, the first factor of ten being introduced by the ten tube recorders 4, the second factor of ten being introduced by the tube retainers 5, of which there are ten for each recorder. Furthermore, the messages have been applied with two accelerating steps, so that to run off each one-hundredth of the total message takes only one one-hundredth of the time which was required to speak it into the microphone 1, which was in turn only one one-hundredth of the time required to speak the entire message, since the message itself has now been divided into one hundred parts.

The message stored in the one hundred tube retainers 5 is now ready to be taken from them by another sweep of the beams, controlled by circuits 24, 29, and 30, this time at constant intensity, and applied to one hundred transmitters 6. This final take-off of the message may be done simultaneously from each tube retainer 5, if desired, this operation being controlled by the timing circuit 24.

Thus, when all transmitters are operated simultaneously, the message may be transmitted in one ten-thousandth the time required to speak the message into microphone 1.

With such a brief transmission time, the transmitters may be greatly overloaded, and for this purpose there is provided a suitable energy storage circuit 32, in which energy may be stored until such time as the transmitter is triggered. During the final take-off of the message from the retainer 5, a triggering circuit 31 applies the energy stored in circuit 32 to the transmitter 6 at the proper moment. Energy storage circuits, represented by the numeral 32 may be either inductive or capacitive in character, and are well-known in the pulse transmission art.

The operation of the system constructed as described is generally, as follows:

The pulse generated by the synchronizer 19, Fig. 2, is a square wave output from a single kick multivibrator. The RC constants are chosen according to the duration of the message desired to be sent and with relation to the speed-up also desired. This pulse is first fed to the grid of the tube recorders 4, Fig. 2, acting as an unblanking pulse for this grid. The rise in voltage representing the first part of the pulse, trips off the vertical step pulse generator 20, for example, Fig. 2. This is a multivibrator, the input side of which is nonconducting and the output side of which is conducting. It generates square wave output. These square waves are sent through a peaker circuit, then through the triode acting as a rectifier, thereby giving an output of positive peaked waves. These peaked waves continue to be generated until the end of the synchronizer pulse, at which time the synchronizer pulse actuates the vertical step 20, for example, return pulse. This is a square wave multivibrator producing a negative square wave with a very short time constant. The square wave with its corresponding peaked waves are impressed on the vertical step generator. The peaked waves actuate the lower part of the vertical step generator, through the tube having a condenser in the cathode circuit. This condenser is charged each time a peaked wave occurs.

When the condenser is fully charged for its vertical step pulse generator, it must be discharged for further use. At this point, the negative pulse generated by the vertical step return pulse generator is fed through an amplifier. It is amplified and inverted to a positive pulse. This is then fed to the grid of a gas filled triode. When the gas ionizes and the tube conducts, the plate potential of this triode is at practically ground potential. This plate is connected to the other side of the condenser and the condenser is effectively grounded, and its charge is reduced to zero. When this charging voltage (increasing by steps) is applied to the vertical deflection plate on the tube recorders, in conjunction with the horizontal sweep, the tube recorder's beam scans the condenser plates. As this is being carried out, the signals received from the wire recorder are being sent on to all of the tube recorders. It is fed to the grid of the cathode ray tube. This effectively modulates the intensity of the cathode ray beam, and therefore, charges each one of individual condenser plates in proportion to the intensity of the cathode ray beam. Therefore, these individual condensers act as retaining or storing agents for the signal. This fact then allows the accelerated signal to be held for a short duration of time.

The next objective is, as shown in Fig. 2, to transfer the signal from units 4. Each unit of the tube recorders 4 has a corresponding series of preferably ten tube retainers as indicated at 28. This effectively again sub-divides the signal on each of the tube recorders into ten separate units.

At the same time the speed of the sweep which takes the message off the tube recorder 4 is accelerated to ten times the speed at which the message was applied to the recorder 4. There should be separate sweeps and separate steps, because they take place at a time immediately after step 20 and sweep 22 and also at an accelerated rate. The rate of speed at which the signal is taken from the tube recorders 4 is at the same rate of speed as that which is used in the tube retainers since the actions are taking place at the same time. The tube retainers for any given tube recorders are not swept with signals at the same time. Signals are swept upon given tube retainers in the sequence in which they are taken from the tube recorders. This, therefore, necessitates a timing unit 24 to blank out all the tube retainers except that which is directly concerned, and also a transferring circuit which transfers from one tube retainer to the next successively as they are required.

Upon the completion of sweep 23 and step 21, all tube retainers have received their corresponding parts of the signal. At this point, since it is later of all the tube retainers will have picked up the signal impressed upon individual plates 14. The functions of these tubes are similar to those of the tube recorders with the exception that the second cathode ray beam, while being equal in intensity at all times, is not necessarily at an accelerated rate to that with which the signal was applied.

While this signal is being taken from the tube retainers, it is also being transmitted, and due to the short time duration of the total transmission, it is possible to overload the transmitter without harm to its circuit.

Since the steps occur after each other in time, an allowance is made to compensate for that time interval. The end of the synchronizer pulse in going from positive to negative trips off the vertical step pulse generator of step 21. Step 29 has a similar arrangement, and in addition, has an RC circuit before the entire step generator. This is indicated as the synchronizer timer 24, Fig. 2, in order to delay this step generator, and also the horizontal sweep, a proper amount of time to allow for prior circuits to perform their functions. Also, in both step 21 and step 29 the negative pulse generated by the vertical step return is fed back to the vertical step pulse multivibrator, with the express purpose of stopping this multivibrator when it is no longer needed. In the case of step 29 the synchronizer pulse does this automatically when it goes from positive to negative at the end of the synchronizer pulse.

Briefly then, a message spoken into the microphone 1, Fig. 1, is recorded on the wire recorder 2. The wire recorder is then accelerated ten-fold. One-tenth of the original message is picked up by each of the pickups 3, for transference to the tube recorder units 4. The tube recorders are then accelerated ten-fold. From each of the tube recorders 4 one-tenth of the one-tenth of the original message is transmitted to each of the tube retainers 5 at the accelerated speed. From each of the tube retainers 5 the one-tenth of the one-tenth of the original message is transferred to each of the transmitters 6 from which those parts of the message are put out on the antenna 7.

For the reception of a so-divided, so-accelerated message, provision of a system substantially similar to the present system may be provided with the parts thereof arranged in substantially reverse order.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In an apparatus of the character described, first detecting means effective to receive a message to be transmitted, a first recorder responsive to said first detecting means and effective to retain the message, a plurality of second detecting means, each said second detecting means being effective to receive a predetermined part of the message retained by said first recorder, a plurality of second recorders corresponding respectively to said plurality of second detecting means, each said second recorder being effective to retain that part of the message received by its corresponding second detecting means, a plurality of third detecting means, each said third detecting means being effective to receive a predetermined portion of the parts of the message retained by said second recorders, and means for transmitting the portions of the message received by each said third detecting means.

2. The method of transmitting intelligence consisting of conveying a message into a microphone, electrically recording the message, dividing the recorded message into a plurality of parts, transmitting each of said parts of the electrically recorded message at an accelerated rate, electrically recording the respective parts of the accelerated message, dividing each of the recorded parts of the message into a plurality of portions, and transmitting each of said portions of the recorded parts of the message at a further accelerated rate.

3. In an apparatus of the character described, first detecting means effective to receive a message to be transmitted, a recorder responsive to said first detecting means and effective to retain the message, a plurality of second detecting means, each said second detecting means being effective to receive a predetermined part of the message retained by said recorder, and means for transmitting the parts of the message received by each said second detecting means.

4. In an apparatus of the character described, a microphone, a wire recorder for receiving a message impressed on the microphone, a tube recorder operatively connected with the wire recorder, a tube retainer operatively connected with the tube recorder, a trip interposed between the wire recorder and the tube recorder, a synchronizer interposed between the trip and the tube recorder reactive to said trip, a horizontal sweep for acting on the energy produced in the tube recorder and retainer to effect scanning therein, a step for controlling the vertical position of application of said energy relative to said tube recorder and tube retainer, a synchronized timer for actuating the tube retainer in desired relation to the tube recorder, and means for transmitting signals impressed on the tube retainer.

5. In an apparatus of the character described, a condenser for a cathode ray tube comprising a plurality of plates each having an insulated recess, a thin coating of conducting material on the outer bounding surfaces of said recess, said material being of resistive character relative to the material of the plate, a plate common to said first named plates, means connecting the individual plates to the common plate, and a dielectric between said plates.

WILLIAM W. CARGILL, JR.

REFERENCES CITED

The following references are of record in the file of this patent:

UNITED STATES PATENTS

| Number | Name | Date |
|---|---|---|
| 1,977,398 | Morrison | Oct. 16, 1934 |
| 2,191,565 | Henroteau | Feb. 27, 1940 |
| 2,219,021 | Riesz | Oct. 22, 1940 |
| 2,245,364 | Riesz et al. | June 10, 1941 |
| 2,277,516 | Henroteau | Mar. 24, 1942 |
| 2,291,476 | Kernkamp | July 28, 1942 |
| 2,301,743 | Nagy et al. | Nov. 10, 1942 |
| 2,312,897 | Guanella | Mar. 2, 1943 |
| 2,406,353 | Myers | Aug. 27, 1946 |